INVENTOR
Robert E. Coleman

United States Patent Office 3,467,834
Patented Sept. 16, 1969

3,467,834
REMOTE SLIDE CHANGING CONTROL SYSTEM
Robert E. Coleman, 825 Almeria Ave.,
Coral Gables, Fla. 33134
Filed Jan. 2, 1968, Ser. No. 695,016
Int. Cl. H01h 35/00, 83/20
U.S. Cl. 307—116      9 Claims

ABSTRACT OF THE DISCLOSURE

A remote control system is operatively connected with a conventional slide projector to control the operation of the slide changing mechanism thereof. The remote control system includes a sound sensing transducer means operatively connected with an amplifier means which in turn is connected through a timing means to a switch means for controlling the operation of the slide changing mechanism of the projector. The timing means is adapted to cyclically operate the slide changing mechanism and operation of the timing means is controlled by the amplifier means in response to the presence or absence of sound as sensed by the transducer means so that a slide change can be effected whenever there is a pause in the sensed sound.

BACKGROUND OF THE INVENTION

The present invention relates to a system for automatically controlling the slide changing mechanism associated with a conventional slide projector in order to correlate the display of projected images with narration from any suitable sound source.

Slide projectors provided with remote control means are widely used for entertainment, promotional, educational and instructional purposes. Many control systems for operating the slide changing mechanism associated with the slide projector have been devices so that automatic operation of the slide changing mechanism may be effected to synchronize the visual display with the narration. Where the narration originates from a person, very often a manually operated remote control switch device is provided so that the narrator may control operation of the slide changing mechanism.

Where the narration originates from an audio reproducing device such as a tape recorder playback mechanism, relatively complex control systems have been provided requiring connections to the playback device and very often preparation of cue signals on the tape on which narration is recorded.

SUMMARY OF THE INVENTION

In accordance with the present invention, a relatively simple automatic control system is provided which requires no connection to the sound source with which operation of the slide projector is correlated. Toward this end, the control device of the present invention has a sound transducer or microphone associated therewith. Thus, whenever narration from the sound source begins, it is sensed by the transducer which is operative through a solid state amplifier to prevent recycling of a timing means which in turn controls cyclic operation of the slide changing mechanism of the associated slide projector.

The timing means undergoes a timing cycle of predetermined duration following a silent period equal to or exceeding the timing cycle period. Should there be any output from the amplifier during the delay period, the timing means is prevented from operating the slide changing mechanism in the slide projector. Thus, when the narration associated with a particular slide is completed, operation of the timing means may resume only after a pause in narration of predetermined duration. By utilizing an amplifier having a coupling capacitor discharged through a bleed resistor, the narrator is provided with as much time as desired within which to resume narration as long as the pause exceeds a minimum period

DESCRIPTION OF THE PREFERRED EMBODIMENT

Figure 1:
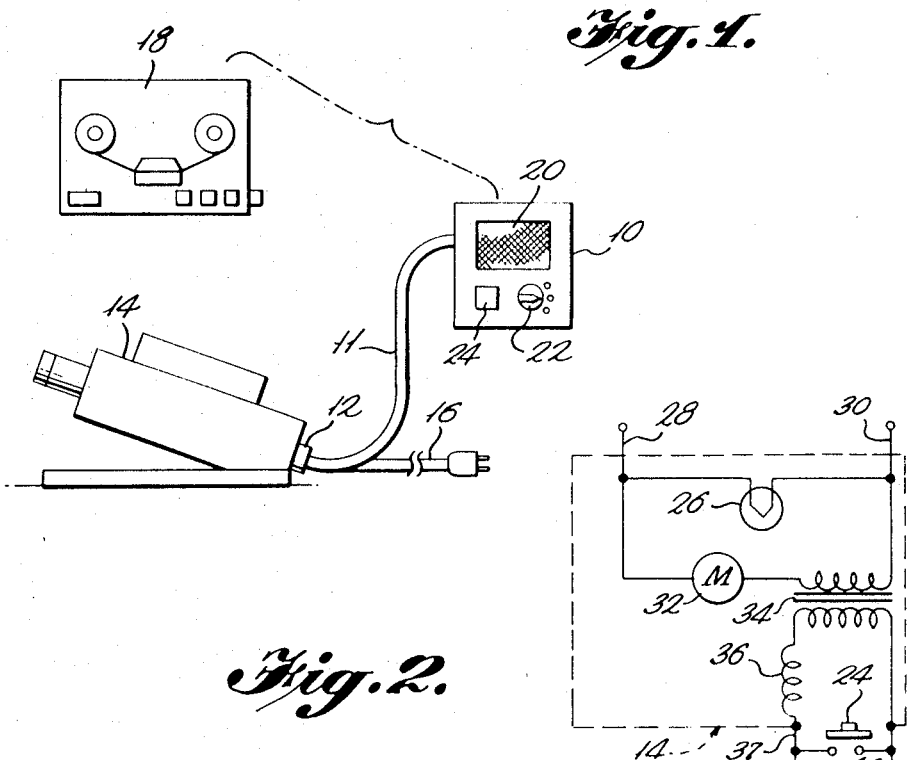
FIG. 1 is a diagrammatic illustration of an audio visual system in accordance with the present invention.

Referring now to the drawing wherein like reference characters designate corresponding parts throughout the several views, FIG. 1 illustrates the remote control slide changing system or device of the present invention indicated generally by reference numeral 10. A cable 11 is connected to device 10 and is plugged into the remote control socket 12 associated with a conventional slide projector 14. Electrical energy for operating the device 10 is derived from the relay and transformer circuit of the slide projector 14. The device is operative to control operation of the slide changing mechanism associated with the slide projector in order to correlate the visual display produced by the projector with narration originating from a sound source such as the conventional tape recorder playback device 18 shown in FIG. 1.

It should however be appreciated that the sound source may comprise other audio reproducing devices or the narrator in person. Accordingly, the device 10 is provided with a sound transducer or microphone 20 suitably located in proximate relation to the sound source. The device enclosure may also mount a mode selector switch assembly 22 and a manual push button device 24 through which operation of the slide changing mechanism may be remotely controlled manually in one mode of operation determined by the position of the selector switch 22.

Figure 2:
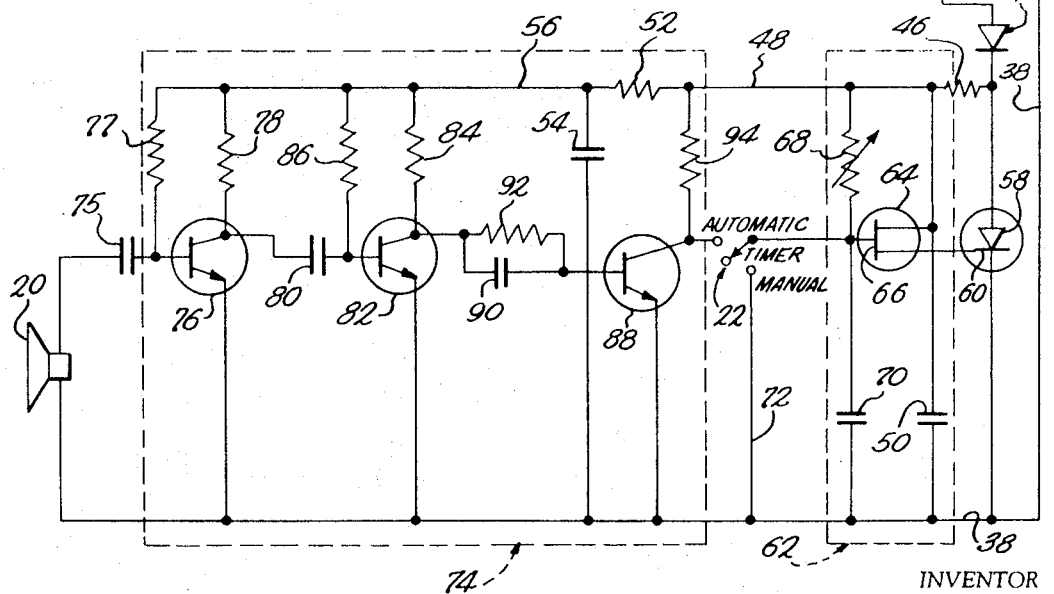
FIG. 2 is an electrical circuit diagram illustrating the system shown in FIG. 1.

By way of example only, FIGURE 2 diagrammatically illustrates the slide projector 14 as including a projection lamp 26 connected across the AC voltage lines 28 and 30 to which the blower motor 32 is connected in series with an extra winding of the motor field assembly to form the primary winding of a transformer 34. The transformer secondary is connected in series with a slide changing relay coil 36 to form a circuit upon closing the push button device 24. It will be appreciated therefore, that closing of the manual push button switch 24 will complete an energizing circuit for the slide changing relay coil 36 in order to effect a slide change. Inasmuch as slide projectors and the slide changing mechanisms associated therewith are well known, the details of which form no part of the present invention, further description of the slide projector and the slide changing mechanism is deemed unnecessary. The present inventory resides instead in the control circuit connected in parallel with the manual push button switch 24 across the voltage lines 37 and 38.

The voltage line 37 is connected by the diode rectifier 44 in series with the voltage reducing resistor 46 to the positive voltage line 48 of the control circuit to form a DC power supply across the voltage lines 48 and 38. Filter capacitor 50 is connected across DC voltage lines 38 and 48, smoothing out the DC voltage without adversely affecting the relay circuit. Resistor 52 and capacitor 54 further smooth out the DC voltage supplied along DC voltage lines 38 and 56. Also connected from diode rectifier 44 to voltage line 38 is a silicon controlled rectifier 58 which is normally non-conductive. When a trigger current is applied to the gate electrode 60 associated with the silicon controlled rectifier, it is switched to a relatively low impedance state to thereby complete an energizing circuit for the slide changing relay coil 36 in order to operate the slide changing mechanism.

Trigger current for the silicon controlled rectifier 58 is derived from a timing circuit indicated generally by reference numeral 62 connected across the voltage lines 48 and 38. The timing circuit includes a uni-junction transistor 64 having an input terminal connected to the positive voltage line 48 and an output terminal connected to the gate electrode 60 of the silicon controlled rectifier 58. The electrode 66 of the transistor 64 is connected to the positive voltage line 48 through an adjustable resistor 68 by which a bias potential is applied to electrode 66. A timing capacitor 70 is connected between electrode 66 of the transistor 64 and the negative voltage line 38.

The resistance value of the resistor 68 and the capacitance of the capacitor 70 determine a delay period preceding the slide changing cycle. Thus, when the transistor 64 is in a non-conductive state, the capacitor 70 will be charged at a rate determined by the resistance of resistor 68 from the positive voltage line 48 until a potential of the positive side of the capacitor is reached which switches the transistor 64 to a conductive state if the mode selector switch 22 is in the timer position illustrated in FIG. 2 for example. When transistor 64 is switched to its conductive state, capacitor 70 discharges through gate electrode 60 of the silicon controlled rectifier thus switching it on. Thus, the slide changing is initiated by momentary current flow through the silicon controlled rectifier 58 triggering relay coil 36. Slide changing operation then ensues during which power to device 10 is cut off. When power is restored upon completion of the slide changing operation, the timer will recycle and another delay period occurs during which the capacitor 70 is charged once again as aforementioned.

When the delay period is ten seconds, the slide changing mechanism will be automatically operated every ten seconds as long as the mode selector switch 22 is in the timer position. By moving the mode selector switch 22 to the manual position, the capacitor 70 is by-passed by conductor 72 so that the negative voltage line 38 will be directly connected to the electrode 66 of transistor 64 holding it in its nonconductive state. The slide changing mechanism may then be operated only by closing of the manual push button switch 24 as aforementioned. When the mode selector switch 22 is in the automatic position, the electrode 66 of the uni-junction transistor 64 is connected to the output of amplifier means indicated by reference numeral 74 to thereby establish control over the timing circuit 62 by the sound source through the transducer 20.

The transducer 20 is connected to the negative voltage line 38 and to one side of a signal coupling capacitor 75, the other side of which is connected to the base of an NPN type transistor 76 in the first amplifier stage. A bias resistor 77 applies a positive potential to the base of transistor 76 for proper gain. The output from the first amplifier stage at the collector of transistor 76 is coupled through the coupling capacitor 80 to the base of the transistor 82. A bias resistor 86 applies a positive potential to the base of transistor 82 for proper gain. The output from the second amplifier stage at the collector of transistor 82 is coupled through the coupling capacitor 90 connected in parallel with bleed resistor 92 to the base of transistor 88. The emitter of transistor 88 is connected to the negative voltage line 38 while the output collector thereof is connected to the positive voltage line 48 through the resistor 94.

The output collector of the transistor 88 is connected to the electrode 66 of the uni-junction transistor 64 in the timing circuit when the mode selector switch 22 is in the automatic position. Timing capacitor 70 is also connected to the output collector of transistor 88 when the mode selector switch is in the automatic position. The timing capacitor 70 can be discharged by the collector circuit of transistor 88 whenever it is conductive.

In the quiescent state of the amplifier when no sound is being sensed by transducer 20, the coupling capacitor 90 is discharged by bleed resistor 92. The potential then applied through resistors 84 and 92 to the base of transistor 88 is sufficiently positive to render transistor 88 conductive to prevent charging of the timing capacitor 70.

However, when sound is sensed by transducer 20, an amplified signal voltage reaches the base of transistor 88. The peaks of this amplified signal voltage are rectified by the base-emitter junction of transistor 88 and charge up coupling capacitor 90 to maximum voltage in one second. When the narration ends, this negative voltage impressed on the base of transistor 88 is sufficient to hold transistor 88 non-conducting for the six-second period required by bleed resistor 92 to discharge coupling capacitor 90. When transistor 88 is thereby held non-conducting for six seconds, it permits the charging of timing capacitor 70 and cycling of the timing circuit in four seconds. The timing circuit attempts to recycle in the next four seconds, but is prevented because the bleed resistor 92 discharges the coupling capacitor 90 and places a positive potential on the base of transistor 88 and discharges timing capacitor 70. Current flow through bleed resistor 92 then renders transistor 88 conductive to prevent recycling for an indefinite period. Accordingly, the narrator may automatically effect a change in slides by means of a pause in the narration which exceeds four seconds. Should narration be resumed in less than four seconds, the peaks of the amplified signal voltage would cause transistor 88 to conduct and discharge timing capacitor 70 before it could initiate an operating cycle.

Thus, when the narrator pauses, a four-second period must elapse in order to permit automatic cycling of the timing circuit 62. This constitutes a minimum pause interval. The narrator may resume narration at any time after four seconds without any recycling. The narrator is thereby relieved of tension in precisely timing the length of the pause in order to produce a change in slides. It should also be appreciated that the delay period may be changed by means of the adjustable resistor 68 if desired to meet different timing requirements. Indeed, the mode selector switch 22 adds resistor 94 in parallel with resistor 68 in the automatic position, producing a timing cycle of four seconds in the automatic position and a timing cycle of ten seconds in the timer position when only resistor 68 is used to charge up the timing capacitor 70. Also, the device 10 could be connected directly to an audio input if desired without using the transducer 20.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. In combination, a slide projector having a slide changing mechanism, a remote control system including sound sensing transducer means, amplifier means connected to said transducer means, timing means for cyclically operating said slide changing mechanism, said amplifier means being connected to said timing means for controlling the operation of said timing means in response to sound sensed by said transducer means, said amplifier means including means for permitting recycling of said timing means for a predetermined period and then preventing further recycling of the timing means.

2. The combination as defined in claim 1 wherein said timing means includes means for providing a predetermined delay period for causing the timing means to recycle periodically.

3. The combination as defined in claim 1 including switch means operatively connected with said slide changing mechanism for controlling the operation thereof, said switch means being connected with and controlled by said timing means.

4. The combination as defined in claim 1 wherein said timing means includes a timing capacitor and resistance means for determining a recycling period of the timing means.

5. In combination, a slide projector having a slide changing mechanism, a remote control system including sound sensing transducer means, amplifier means connected to said transducer means, timing means for cyclically operating said slide changing mechanism, said amplifier means being connected to said timing means for controlling the operation of said timing means in response to sound sensed by said transducer means, said amplifier means including capacitive coupling means adapted to be charged when sound is sensed by said transducer means for preventing the timing means from operating said slide changing mechanism, and bleed resistor means connected in parallel with said capacitive coupling means for discharging said capacitive coupling means and to prevent recycling of the timing means and the slide changing mechanism controlled thereby.

6. In combination, a slide projector having a slide changing mechanism, a remote control system including sound sensing transducer means, amplifier means connected to said transducer means, timing means for cyclically operating said slide changing mechanism, said amplifier means being connected to said timing means for controlling the operating of said timing means in response to sound sensed by said transducer means, and a mode selector having an automatic position in which said amplifier means is connected with said timing means, said mode selector also having a timer position wherein said timing means is disconnected from the amplifier means whereby the timing means automatically continuously recycles.

7. The combination as defined in claim 6 wherein said mode selector also includes a manual position for preventing the timing means from controlling the operation of said slide changing mechanism, and manually operated switch means for manually controlling the operation of said slide changing mechanism.

8. In combination, a slide projector having a slide changing mechanism, a remote control system including sound sensing transducer means, amplifier means connected to said transducer means, timing means for cyclically operating said slide changing mechanism, said amplifier means being connected to said timing means for controlling the operation of said timing means in response to sound sensed by said transducer means, said amplifier means including capacitive coupling means adapted to be charged when sound is sensed by said transducer means, a bleed resistor connected in parallel with said capacitive coupling means to discharge said capacitive coupling means and to prevent recycling of the timing means and the slide changing mechanism controlled thereby, and a mode selector having an automatic position wherein the amplifier means is connected with said timing means, a timer position in which the timing means is disconnected from said amplifier means and whereby the timing means and the associated slide changing mechanism are continuously recycled, said mode selector also having a manual position for preventing the timing means from controlling the operation of said slide changing mechanism, and manually operable switch means for controlling the operation of said slide changing mechanism.

9. In combination, a slide projector having a slide changing mechanism, a remote control system including sound sensing transducer means, amplifier means connected to said transducer means, timing means for cyclically operating said slide changing mechanism, said amplifier means being connected to said timing means for controlling the operation of said timing means in response to sound sensed by said transducer means, said timing means including a timing capacitor and resistance means for determining a recycling period of the timing means, said amplifier means including capacitive coupling means adapted to be charged when sound is sensed by said transducer means, and a bleed resistor connected in parallel with said capacitive coupling means to provide a predetermined period required by the bleed resistor to discharge said capacitive coupling means.

References Cited
UNITED STATES PATENTS

| | | | |
|---|---|---|---|
| 2,954,489 | 9/1960 | Brueggeman et al. | 307—140 X |
| 3,270,216 | 8/1966 | Dersch | 307—117 |
| 3,277,320 | 10/1966 | Conner | 307—252 X |
| 3,289,016 | 11/1966 | Bloom et al. | 307—116 |

ROBERT K. SCHAEFER, Primary Examiner

T. B. JOIKE, Assistant Examiner

U.S. Cl. X.R.

40—28.3; 307—140, 141, 293